(12) United States Patent
Cohn

(10) Patent No.: US 8,129,177 B2
(45) Date of Patent: Mar. 6, 2012

(54) COMPOSTING SYSTEMS AND METHODS

(75) Inventor: Russell S. Cohn, San Francisco, CA (US)

(73) Assignee: Nature Mill, Inc., San Francisco, CA (US)

( * ) Notice: Subject to any disclaimer, the term of this patent is extended or adjusted under 35 U.S.C. 154(b) by 565 days.

(21) Appl. No.: 11/998,661

(22) Filed: Nov. 30, 2007

(65) Prior Publication Data

US 2008/0209967 A1 Sep. 4, 2008

(51) Int. Cl.
*C12M 1/00* (2006.01)
*C12M 1/02* (2006.01)
*C12M 1/10* (2006.01)
*C05F 11/08* (2006.01)

(52) U.S. Cl. ............... 435/290.4; 435/290.1; 435/290.2; 435/291.1; 435/291.3; 435/291.5; 71/8; 71/9; 71/11; 71/14; 71/23

(58) Field of Classification Search ............... 435/290.1, 435/290.2, 290.4, 291.1, 291.3, 291.5; 71/8, 71/9, 11, 14, 23
See application file for complete search history.

(56) References Cited

U.S. PATENT DOCUMENTS

| | | | | |
|---|---|---|---|---|
| 1,961,990 | A | * | 6/1934 | Sleeman ..................... 34/172 |
| D161,649 | S | | 1/1951 | Riordan |
| 4,436,817 | A | * | 3/1984 | Nemetz ..................... 435/290.4 |
| 4,499,614 | A | | 2/1985 | Yeagley |
| 4,869,877 | A | * | 9/1989 | Sellew et al. ............... 435/290.2 |
| 5,377,921 | A | | 1/1995 | Wirth |
| 5,433,524 | A | | 7/1995 | Wuster |
| 5,517,767 | A | * | 5/1996 | Schechinger et al. .......... 34/174 |
| 5,587,320 | A | * | 12/1996 | Shindo et al. ............... 435/290.1 |
| D386,904 | S | | 12/1997 | Bradshaw, Jr. |
| 5,753,498 | A | * | 5/1998 | Ueda et al. ................. 435/290.2 |
| 5,766,935 | A | | 6/1998 | Seagren |
| 6,284,528 | B1 | | 9/2001 | Wright |
| 6,458,240 | B1 | * | 10/2002 | Bouchette et al. ................. 162/4 |
| D576,371 | S | | 9/2008 | Zimmerman |
| D641,119 | S | | 7/2011 | Rampton et al. |
| D644,389 | S | | 8/2011 | Roberts et al. |
| 2004/0029262 | A1 | * | 2/2004 | Walker ....................... 435/290.1 |
| 2008/0209967 | A1 | | 9/2008 | Cohn |

* cited by examiner

*Primary Examiner* — Nathan Bowers
(74) *Attorney, Agent, or Firm* — Haverstock & Owens LLP

(57) ABSTRACT

Systems and methods for automated, rapid composting are disclosed. An air-tight housing prevents odors from leaking out. The housing is thermally insulated to enable the compost to achieve sufficient temperatures for rapid composting. A chambered system, generally including an optional hopper, a reactor, and a cure tray, physically shields odorous material from the external environment. A mixing wand mechanically mixes and/or breaks up the compost material and enhances air flow therethrough. A drip tray segregates liquid byproducts from the solid compost material. An air pump draws in air, while a carbon filter may absorb odors before returning the air to the external environment. A motor provides mixing, and facilitates opening and closing of the two trap doors separating the chambers. An electronic controller automates the composting process while allowing certain settings to be adjusted.

20 Claims, 6 Drawing Sheets

COMPOSTING SYSTEMS AND METHODS

CROSS REFERENCE TO RELATED APPLICATIONS

This application claims the benefit of PCT International Application No. PCT/US2006/030908, filed on Aug. 8, 2006 and titled "COMPOSTING SYSTEMS AND METHODS," which claims priority of U.S. Provisional Application No. 60/706,811, filed on Aug. 8, 2005, all of which are hereby incorporated by reference.

BACKGROUND OF THE INVENTION

1. Field of the Invention

The present invention relates generally to a compost machine. More specifically, systems and methods for automated, rapid composting are disclosed.

2. Description of Related Art

Composting is the natural process of breaking down organic material into a stable material which can be used as fertilizer. Composting is typically conducted outdoors due to odors and messy liquid byproducts. Composting tends to attract insects and other vermin. Composting can produce large quantities of toxic bacteria.

A variety of compost devices exist. One type of composting relies on micro-organisms to consume organic waste materials, thereby reducing the volume of the waste material and rendering it safe for handling. The simplest compost devices of this type are stationary or rotating bins that constrain the compost material and aid in manual mixing and air flow. These are intended for use in the backyard or a well ventilated utility room, for example. More advanced devices may include automatic equipment for mixing and handling compost material while providing air flow. Such devices require special training for operation and maintenance. They generally produce odors and noise. These are intended for industrial use by municipal waste sites, hospitals, schools, prisons, and others. Devices such as compost toilets for composting specific materials also exist.

A related group of compost devices relies on a process known as worm composting, or vermin-composting. These devices use worms rather than micro-organisms to consume the waste. Worms can quickly consume large quantities of organic waste, although certain wastes such as dairy and meat are not suitable. The presence of live worms and odors produced can be problematic for many users.

A variety of tools exist to aid in the composting process. These include buckets to temporarily contain compostable material and reduce odors while awaiting transport to a compost device, compost thermometers, hand mixing tools, sifting screens, and blends of compost micro-organisms and nutritive additives.

What would be desirable is a compost device that may be located near where compostable wastes are produced. Ideally, the compost device may be an indoor device and may emit little or no odor, be automatic, and require little or no maintenance and/or cleaning. It would also be desirable that the device operates with little noise and consumes only a small amount of energy. The device may also be space-efficient such that it is practical to use in a standard household kitchen.

SUMMARY OF THE INVENTION

Systems and methods for automated, rapid composting are disclosed. It should be appreciated that the present invention can be implemented in numerous ways, including as a process, an apparatus, a system, a device, or a method. Several inventive embodiments of the present invention are described below.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for automated, rapid composting are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
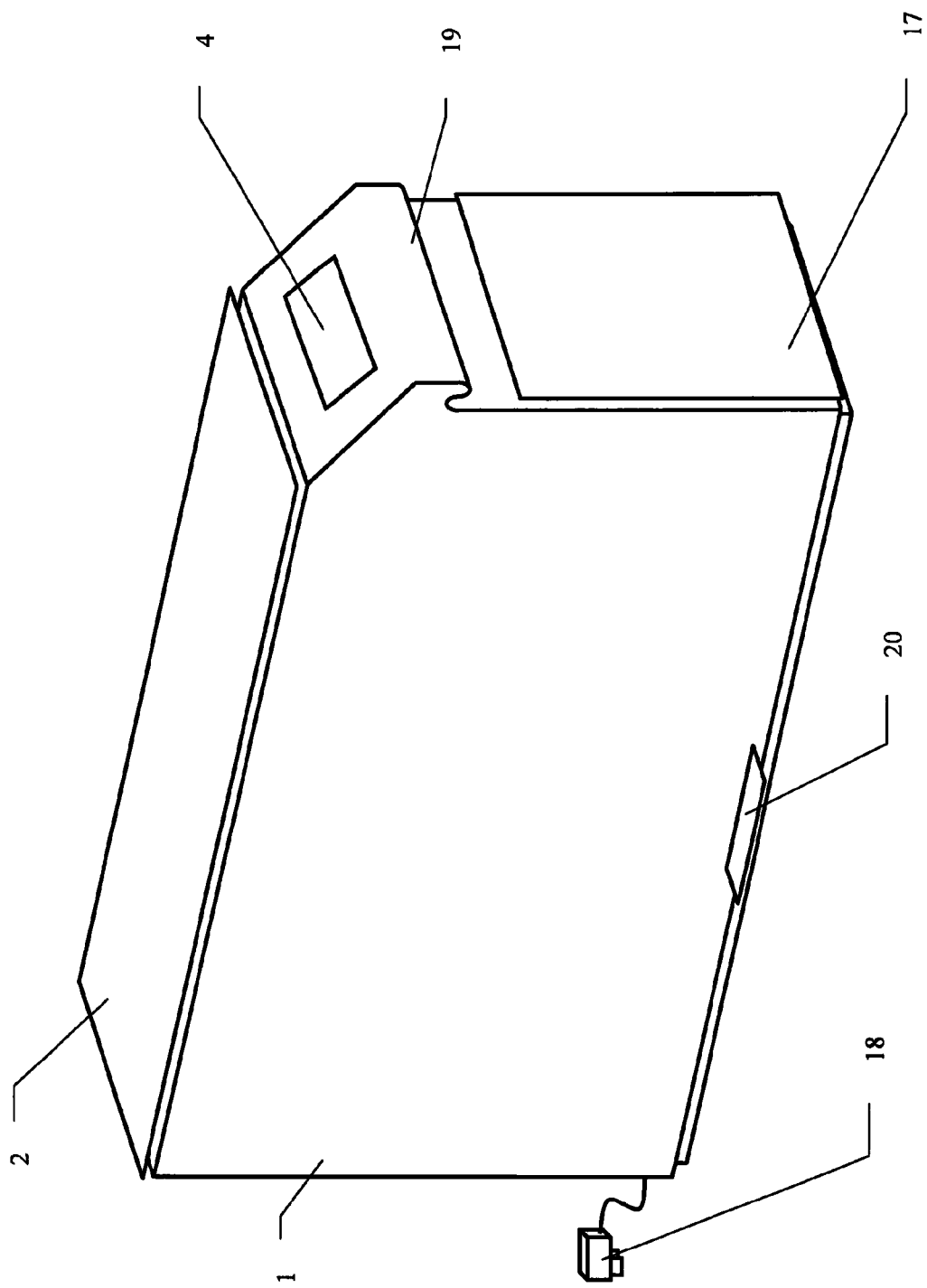
FIG. 1 is a perspective view of an illustrative compost machine.
Figure 2A:
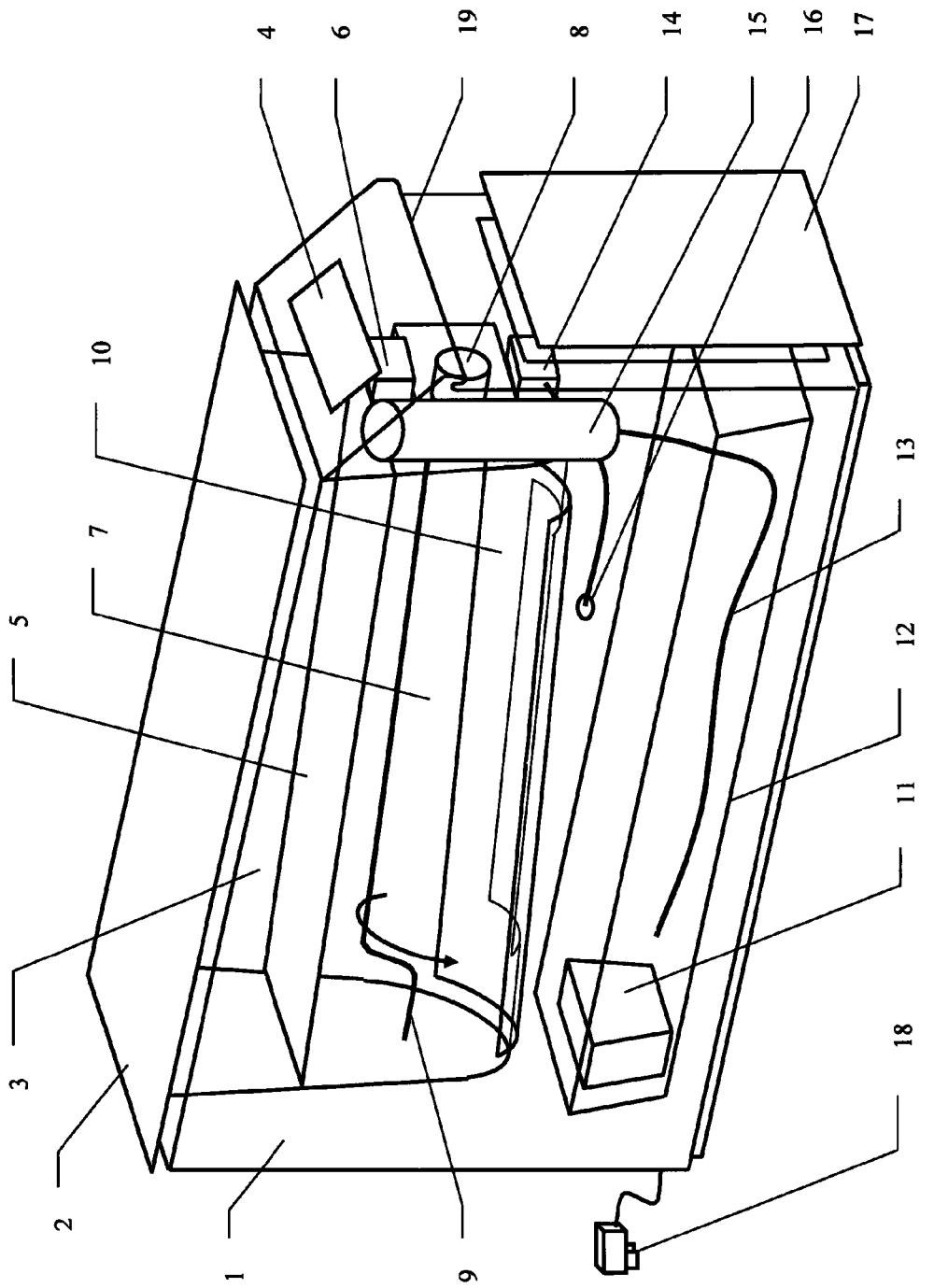
FIG. 2A is a perspective cutaway view illustrating internal components of the illustrative compost machine of FIG. 1.
Figure 3:
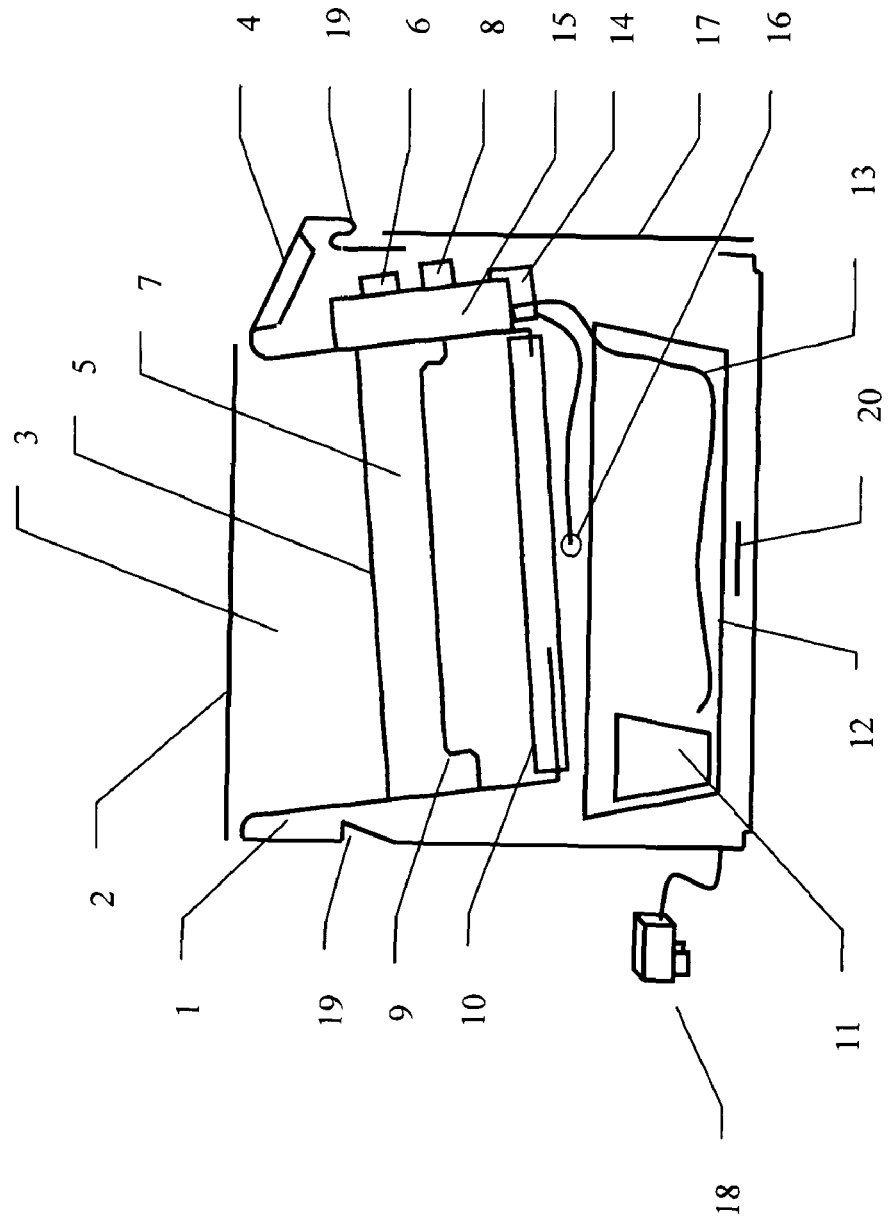
FIG. 3 is a side cross-sectional side view of the illustrative compost machine of FIG. 1.
Figure 4:
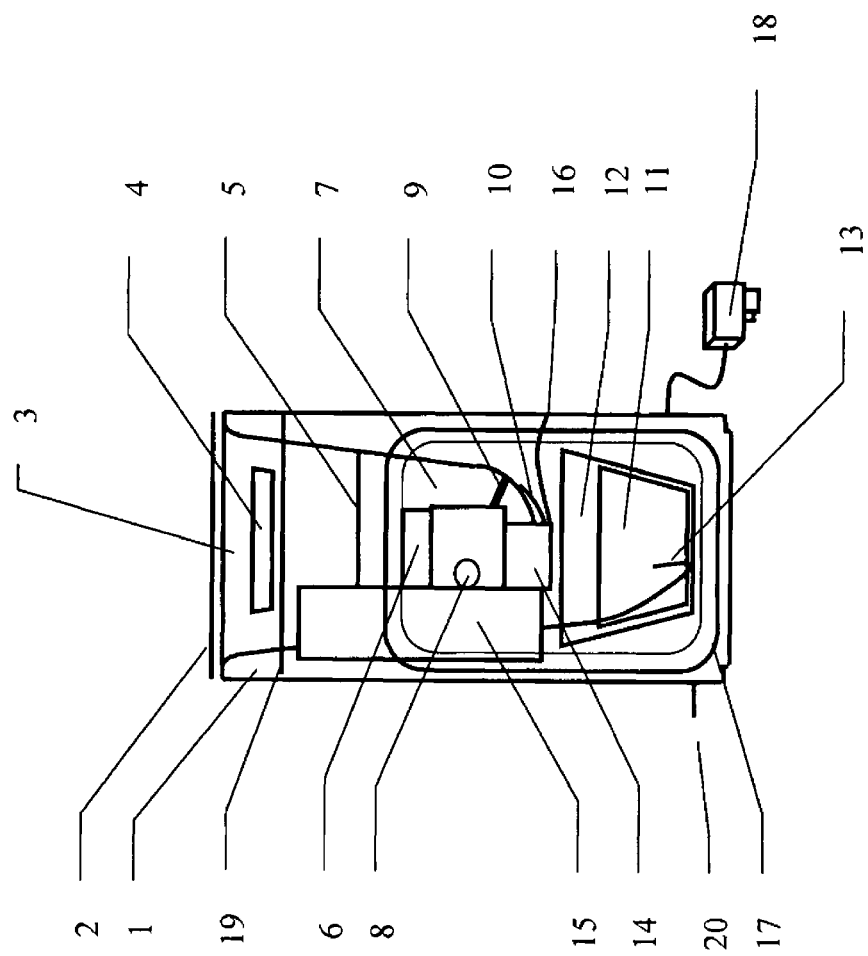
FIG. 4 is a side cross-sectional front view of the illustrative compost machine of FIG. 1.
Figure 5:
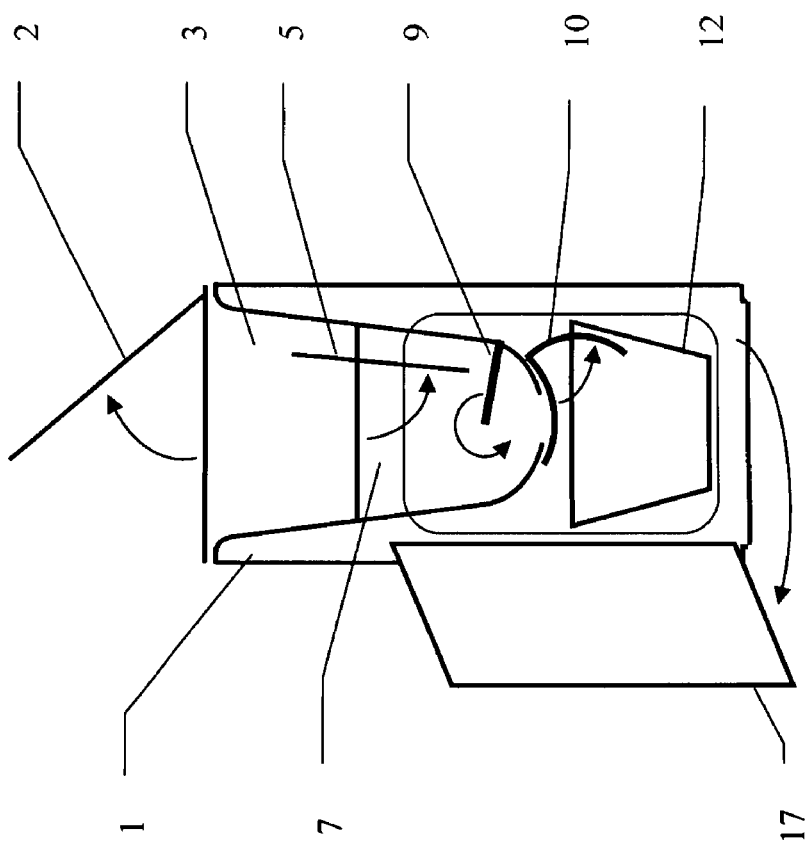
FIG. 5 is a side cross-sectional rear view of the illustrative compost machine of FIG. 1.

FIGS. 1 and 2A are a perspective view and a perspective cutaway view of an illustrative compost machine generally contained inside a housing 1. FIGS. 3, 4, and 5 are side cross-sectional side, front and rear views, respectively, of the illustrative compost machine of FIG. 1. The compost machine may be multi-chambered and configured to be fully automatic and self-contained for indoor use. The housing 1 may be dimensioned to fit within a standard household kitchen cabinet (e.g., a full height cabinet or a portion of the cabinet below a typical drawer with an internal depth of approximately 24"). The housing may be air sealed to prevent odors from leaking out of the compost machine such that the compost machine emits little or no unpleasant odors. The housing 1 may include a layer of thermally insulating material to enable the compost material to reach temperatures necessary for rapid composting. The housing 1 and/or other internal components are preferably constructed of non-corrosive materials such as aluminum, stainless steel, plastics, etc. due to contact with wet material.

The lid 2 can be opened, e.g., hinges upward, to expose the hopper chamber 3 where compostable waste material may be deposited. The lid and hopper may be approximately as long and wide as the overall device, so as to help prevent spilling of waste material outside of the hopper. An initial supply of compost microorganisms is preferably introduced into the machine via the hopper. As an example, ordinary outdoor soil may be used as the initial source of compost bacteria. As an alternative, cultured compost bacteria may be alternatively or additionally used. Generally, the micro-organisms reproduce inside the machine and remain as long as adequate compost material is present.

The user may push a button or other type of switch provided on the electronic controller 4 to signal that the upper trap door 5 is ready to be opened and the contents of the hopper 3 emptied to below, such as when the hopper becomes full although the user may push the button before the hopper has become full. The compost machine may thus provide a simple one-button operation in which activation of the button (or other switch) signals to the electronic controller 4 that (i) material is ready for cycling from the reactor chamber to the cure tray, (ii) the user has cleared a jam (e.g., if a jam light was previously on); and/or (iii) finished compost has been emptied from the compost machine (e.g., if a full light previously on). Generally, the upper trap door 5 will not open before a preset minimum number of days has passed, e.g. 2 days, since the previous time that the upper trap door 5 was opened and will open automatically if a preset maximum number of days has already passed, e.g. 6 days. The electronic controller 4 may optionally also allow the upper trap door 5 to open if a preset maximum amount of time, e.g., 30 minutes, has not passed since the previous time that the upper trap door 5 was opened, e.g., to allow the user to add additional material for composting. If such a feature is provided, the electronic controller 4 may allow a maximum number, e.g., 2, of such subsequent openings of the upper trap door 5 to occur to as to the facilitate the composting process.

To open the upper trap door 5, a latch such as the solenoid latch 6 can be activated by the electronic controller, releasing the upper trap door which then falls, along with the contents of the hopper, by gravity. The upper trap door may rotate on its axis (as shown in FIG. 5). The waste material in the hopper 3 falls into the reactor chamber 7 below. The upper trap door 5 then closes when the latch is released and the motor 8 turns a mixer such as a mixing wand 9, e.g., in the forward direction, to push the upper trap door back to the closed position. The upper trap door is preferably approximately as long and as wide as both the hopper and the reactor chamber to facilitate material flow from one chamber to the next.

The mixing wand mixes the compost material to help break down the material and improve air flow therethrough. In one embodiment, the mixing wand may be a single curved rod to help prevent jamming and minimize dead spots where no mixing occurs. Merely as example, the mixing wand 9 may be a U-shaped rod (as shown in FIG. 3) or may be a rod in a step-jog shape (reference 9A in FIG. 2B). Preferably, the mixer is configured without a central axle to help prevent any material from grabbing onto the axle and becoming tightened around the mixer with each revolution. Other mixing wand configurations may be employed such as a mixing paddle or a rotating tumbler, for example.

The shapes of the bottom of the reactor chamber and the mixer (and its path/swath at the bottom of the reactor) are preferably matched such that the path of the mixer generally follows the bottom of the reactor chamber so as minimize any dead spots where no mixing occurs. As an example, the reactor chamber may have a curved bottom. The reactor chamber, the mixer, and the lower trap door 10 can be angled downward such that any liquid byproduct from the composting drains down generally in one direction and into a drip container such as a drip tray 11. A drain hole may be provided in the reactor chamber to allow fluid to drain from the reactor chamber into the drip tray. Preferably, the mixer sweeps past the drain hole on the bottom of the reactor with each rotation to prevent or help minimize clogging.

To maintain ideal moisture level of the compost, the mixer may be used to frequently mix compost, e.g., 1-10 times per day. This allows wet material at the bottom of the reactor chamber to mix with dry material at the top, thereby creating a more uniform and ideal moisture level throughout. Without sufficient mixing, too much fluid may drain into the drop tray, resulting in the material becoming excessively dry.

Figure 2B:
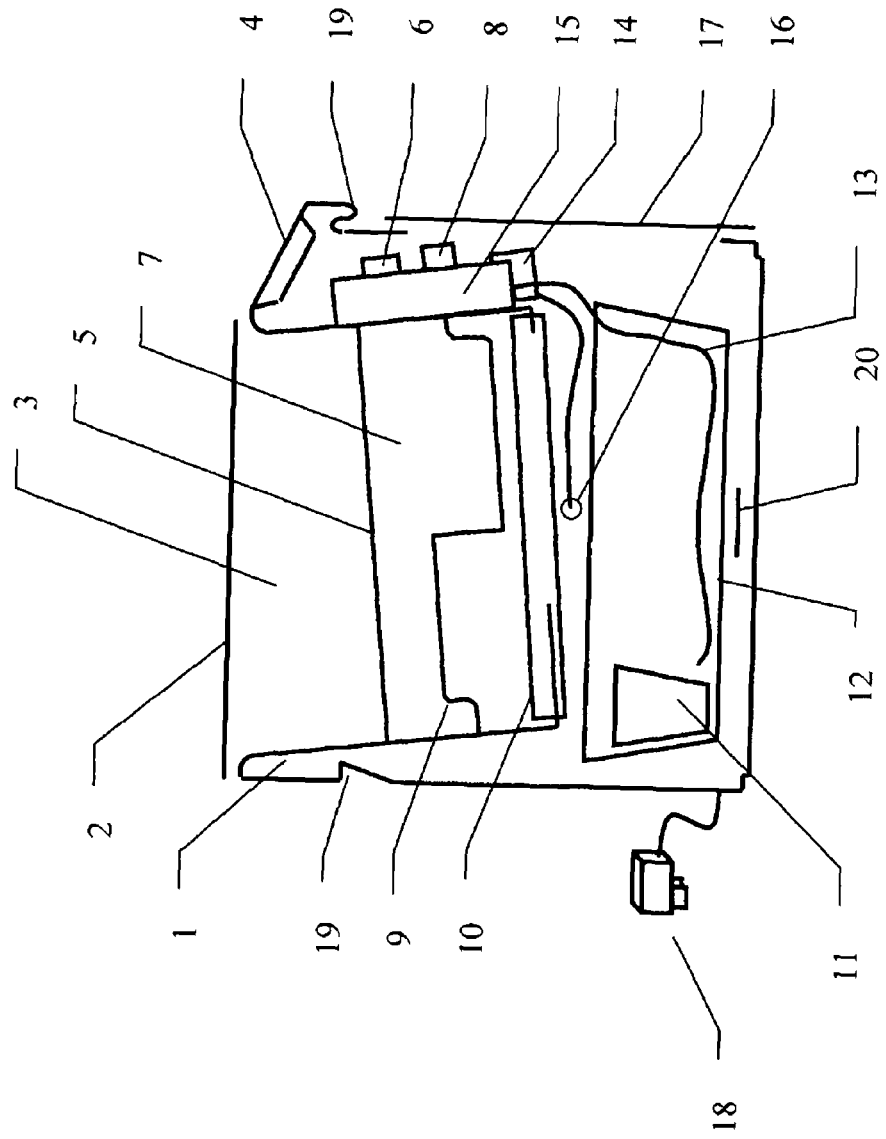
FIG. 2B is a perspective cutaway view illustrating internal components of an alternative configuration of the compost machine.

As an alternative, the compost machine may be configured without a hopper and without the upper trap door and may have only two chambers: a reactor chamber 7 and a cure tray 12. Regardless of whether the compost machine is configured with or without a hopper, the lid may instead be configured as a side opening chute through which items to be composted may be added. The side opening chute may be located on a side of the compost machine (as shown in FIG. 2B) or on the front of the compost machine (e.g., integrated with the electronic controller 4). Such a configuration may facilitate in allowing the user to add items to be composted while the compost machine remains housed within a standard household (e.g., residential) kitchen cabinet. Preferably, the side opening chute is configured with an air trap or air lock such that items to be composted may be added with a minimum amount of unpleasant odors escaping from the reactor chamber 7. As an example, the air trap 24 may be provided with a rubber gasket to provide a better seal. A label on the lid may be provided to summarize directions for usage of the compost machine and/or to specify what materials are or are not suitable for composting.

Prior to the subsequent time that the upper trap door (if provided) opens as described above, the lower trap door 10 opens to empty the reactor chamber. Note that the reactor chamber may retain some of the compost material after each cycle to provide compost bacteria for the next cycle such that no additional source of cultures needs to be added for subsequent composting cycles. To open the lower trap door 10, the electronic controller may rotate the motor and the mixing wand in reverse so as to push the lower trap door open about its hinged axis. A spring mechanism may keep the lower trap door 10 generally closed. A similar spring mechanism may also be provided to keep the upper trap door 5 (if provided) generally closed.

The compost material then falls through the lower trap door opening and into the cure compartment such as a removable cure tray 12. Liquid and solid materials are segregated into the drip tray and cure tray, respectively, due to the horizontally sloped alignment of the lower trap door opening. The drip tray may be located inside the cure tray such that if the drip tray overflows with liquid, the overflow liquid will be contained inside the cure tray and will not leak into other areas within the housing. Once the contents of the reactor chamber have dropped into the cure tray, the lower trap door closes in preparation for a next batch of waste material to be composted in the reactor chamber 7. To close the lower trap door, the electronic controller may spin or rotate the motor and mixing wand in the forward direction so as to push the lower trap door into the closed position.

As is evident, material to be composted is moved from one chamber to the next (e.g., from hopper to the reactor chamber and/or from the reactor chamber to the cure tray) by force of gravity. Fluid similarly moves into the drip tray by force of gravity, preferably without use of pumps or active controls although such may be provided and utilized depending on the application. Using gravity to move material from one chamber to the next is more efficient and more cost effective than moving material using mechanical conveyor belts or the like. The compost machine is thus self-cleaning in that waster material drops down via gravity into the reactor chamber (where it is mixed in with compost) and/or into the removable cure tray. Water condensation dripping down into the drip tray also facilitates in the cleaning process.

Air flow provides oxygen to the compost micro-organisms and helps to minimize or prevent unpleasant odors from escaping from the housing 1. For example, an air pump 14, e.g., a fan, may be provided to draw air into the machine such as via the gap between the lid and the upper most portion of the housing. Alternatively or additionally, a passive vent may be provided to allow air to flow into the compost machine. The air flows down through the hopper, the reactor chamber, the cure tray, and into the air intake tube 13 which can be located at the inside bottom of the cure tray. The air pump 14 provides the pressure to move the air throughout the machine. The air filter 15 facilitates in absorbing odors from the air stream using, for example, electrostatic filter and/or activated carbon powder. The filtered air is subsequently passed out of the machine through an air outlet port 16, which may be located on the back of the housing, and back into the external environment. The air pump may be controlled by the electronic controller and may be constantly circulating air or can be cycled on and off. An optional heater and/or temperature gauge can be provided to generate heat to facilitate the composting process. The heater and/or temperature gauge may also be controlled by the electronic controller, e.g., a thermostat controller. In one example, the temperature may be maintained at or around 140° F.

The combination of air flow exhausting outside of the compost machine through the air outlet port and fluid draining into the drip tray facilitates in maintaining an ideal moisture level within the compost machine and in preventing pooling of fluid inside the air filter or the air intake tube and/or in preventing moisture from condensing on the interior walls of the compost machine.

During usage, baking soda (e.g., a few teaspoons) may be added either manually by the user or automatically into the composting material to help balance the pH of the material to be composted. When the composting process is complete, the cure tray and drip tray can be manually removed by the user through the side door 17 which may be hinged, may have a gasket and/or may be closed tightly to prevent air leakage when closed. By configuring the cure tray (and optionally the drip tray) to be removable from the compost machine housing, compost can be easily removed by removing the entire cure tray out of the compost machine. Scooping of the compost from within the housing would thus be obviated.

The electronic controller may be in communication with various sensors and with one or more displays for displaying, for example, moisture level (via a moisture level sensor), pH, and/or temperature. Indicator lights on the electronic controller may be provided to inform the user of jamming, mixing, when to empty the finished compost, and/or ready status. In particular, a jam sensor may be provided such that if the motor stalls (e.g., machine is jammed), power may be pulsed to the motor until the motor breaks free or until a predetermined maximum pulse cycles and/or time has elapsed since the jam was detected. If the jam is not corrected, the jam sensor may then shut off the motor and the jam indicator light may be lit to notify the user of necessary user intervention or correction. The electronic controller preferably automates the composting process. A power supply 18 or a battery (not shown) provides electricity to the electronic controller, air pump, motor, and latch. Two opposing handles 19 can be provided to allow for easy positioning and transport of the device by a user. A foot pedal 20 coupled to the lid 2 can be provided to allow for easy hands-free opening of the lid 2 by the user.

Although the compost machine may be configured to be suitable for indoor use, the compost machine may be weatherproofed. For example, the wiring, electrical components, and/or other sensitive components are preferably mounted above any accumulation of fluid and/or protected from rain or otherwise weatherproofed.

While the exemplary embodiments of the present invention are described and illustrated herein, it will be appreciated that they are merely illustrative and that modifications can be made to these embodiments without departing from the spirit and scope of the invention. For example, a paper shredder (e.g., strip or cross-cut shredder) may be integrated into the compost machine (such as in the lid) to allow shredded paper to be mixed and composted with other wastes in the reaction chamber and the cure tray. Thus, the scope of the invention is intended to be defined only in terms of the following claims as may be amended, with each claim being expressly incorporated into this Description of Specific Embodiments as an embodiment of the invention.

What is claimed is:

1. An automatic, self-contained compost device, comprising:
    a housing defining an air outlet port;
    a reactor housed within the housing for receiving composting material;
    a door coupled at a bottom of the reactor and configured to retain the composting material within the reactor when the door is closed and to empty the composting material from the reactor when the door is opened;
    a mixer housed in the reactor, the mixer being configured to mix the composting material in the reactor;
    a motor coupled to the mixer and configured to rotate the mixer;
    a cure tray housed within the housing and below the reactor for receiving compost material dropped from the reactor when the door is opened;
    an air flow device for controlling airflow into and within the housing;
    an air filter in communication with the air outlet port configured to filter air in the housing prior to the air exiting the housing; and
    an electronic controller for automatically controlling the motor, the door, and the air flow device wherein the door is angled downward such that a liquid byproduct from the composting material drains by gravity into an area within the cure tray.

2. The compost device of claim 1, wherein the air filter is selected from an activated charcoal filter and an electrostatic filter.

3. The compost device of claim 1, further comprising a heater, the electronic controller being in communication with the heater to automatically control the heater.

4. The compost device of claim 1, wherein the cure tray is configured to be repeatedly removable from the housing.

5. The compost device of claim 1, further comprising a drip tray configured to received and hold the liquid byproduct from the reactor.

6. The compost device of claim 5, wherein the drip tray is located at an end of the cure tray.

7. The compost device of claim 1, wherein the housing is thermally insulated.

8. The compost device of claim 1, wherein the motor includes a jam sensor in communication with the electronic controller, the jam sensor being configured to detect motor jams.

9. The compost device of claim 1, wherein the electronic controller is configured to cause the motor to rotate the mixer at a predetermined frequency.

10. The compost device of claim 1, further comprising a hopper housed within the housing and above the reactor, the hopper being configured to receive composting material prior the composting material being dropped into the reactor.

11. The compost device of claim 1, further comprising an air filter coupled to the air flow device housed within the housing for odor control.

12. The compost device of claim 1, further comprising a drip tray configured to collect condensation within the housing.

13. The compost device of claim 1, further comprising a moisture level sensor in communication with the electronic controller for detecting the moisture level within the housing.

14. The compost device of claim 1, further comprising an exhaust port in fluid communication with the air flow device.

15. The compost device of claim 1, wherein the mixer is a mixing wand having a shape selected from the group consisting of a step jog shape and a U-shape.

16. The compost device of claim 1, wherein the housing includes a side-opening chute positioned above the reactor such that the composting material is deposited into the side-opening chute.

17. The compost device of claim 1, wherein the mixer is configured to rotate in a reverse direction of the direction used to mix the composting material, to open the door.

18. The compost device of claim 1, wherein the door comprises a hinge mechanism configured to maintain the door in a closed position.

19. An automatic, self-contained compost device, comprising:
a housing defining an air outlet port;
a reactor housed within the housing for receiving composting material;
a door coupled at a bottom of the reactor and configured to retain the composting material within the reactor when the door is closed and to empty the composting material from the reactor when the door is opened;
a mixer housed in the reactor, the mixer being configured to rotate in a first direction to mix the composting material in the reactor and configured to rotate in a reverse direction of the first direction to open the door;
a motor coupled to the mixer and configured to rotate the mixer;
a cure tray housed within the housing and below the reactor for receiving compost material dropped from the reactor when the door is opened;
an air flow device for controlling airflow into and within the housing; and
an air filter in communication with the air outlet port configured to filter air in the housing prior to the air exiting the housing wherein the door is angled downward such that a liquid byproduct from the composting material drains by gravity into an area within the cure tray.

20. A method for composting comprising:
receiving composting material into a reactor housed within a housing;
collecting the composting material in the reactor when a door coupled at a bottom of the reactor is closed;
automatically mixing the composting material in the reactor using a mixer controlled by an electronic controller;
dropping, via gravity, the composting material in the reactor into a cure tray when the door coupled to the bottom portion of the reactor is opened;
automatically controlling airflow into and within the housing via an airflow device; and
automatically filtering air exiting the housing air outlet port using an air filter wherein the door is angled downward such that a liquid byproduct from the composting material drains by gravity into an area within the cure tray.

* * * * *